United States Patent [19]
Kazakis et al.

[11] Patent Number: 5,454,399
[45] Date of Patent: Oct. 3, 1995

[54] APPLICATION AND RELEASE MAGNET VALVE

[75] Inventors: Michael V. Kazakis, Greenville; Padmanab L. Gowda, Greer; Richard M. Hisker, Moore, all of S.C.

[73] Assignee: Westinghouse Air Brake Company, Wilmerding, Pa.

[21] Appl. No.: 43,679

[22] Filed: Apr. 8, 1993

[51] Int. Cl.$^6$ ................................. F15B 13/043
[52] U.S. Cl. ................. 137/596.16; 91/454; 137/596.18; 137/901; 251/61.3; 303/118.1
[58] Field of Search .................... 137/454.6, 596.16, 137/596.18, 901; 91/454; 251/61.3; 303/118.1, 119.2

[56] References Cited

U.S. PATENT DOCUMENTS

| | | | |
|---|---|---|---|
| Re. 31,161 | 3/1983 | Mahorney | 137/596.18 X |
| 595,061 | 12/1897 | Gulland | 137/901 X |
| 2,293,068 | 8/1942 | McLaughlin | 281/61.3 |
| 3,176,954 | 4/1965 | Cameron et al. | 137/596.16 |
| 3,905,393 | 9/1975 | Hartwig | 137/901 X |
| 4,111,226 | 9/1978 | Cameron | 137/596.18 X |
| 5,261,442 | 11/1993 | Kingsford et al. | 251/61.3 X |

FOREIGN PATENT DOCUMENTS

| | | | |
|---|---|---|---|
| 0516348 | 12/1992 | European Pat. Off. | 303/118.1 |
| 2584988 | 1/1987 | France | 303/119.2 |
| 2655951 | 6/1978 | Germany | 303/118.1 |
| 3821044 | 6/1989 | Germany | 303/118.1 |
| 3940232 | 6/1991 | Germany | 303/118.1 |
| 62-46753 | 2/1987 | Japan | 303/118.1 |

OTHER PUBLICATIONS

Industrial Hydraulic Technology, Bulletin 0221–B1, Apr., 1982, pp. 6–1 through 6–3, Parker–Hannifin Corporation, 17325 Euclid Avenue, Cleveland, Ohio, 44112 (Parker).

*Primary Examiner*—Gerald A. Michalsky
*Attorney, Agent, or Firm*—John B. Sotak

[57] ABSTRACT

An application and release magnet valve including an electropneumatic pilot valve portion for controlling a main air valve portion for supplying, maintaining, and releasing air pressure in the brake cylinders on a railway vehicle. The electropneumatic pilot valve portion includes an application solenoid which opens a first diaphragm actuated ball check valve in the main air valve portion to supply air from a supply port to a delivery port and includes a release solenoid which opens a second diaphragm actuated ball check valve to vent air from the delivery port to an exhaust port.

19 Claims, 1 Drawing Sheet

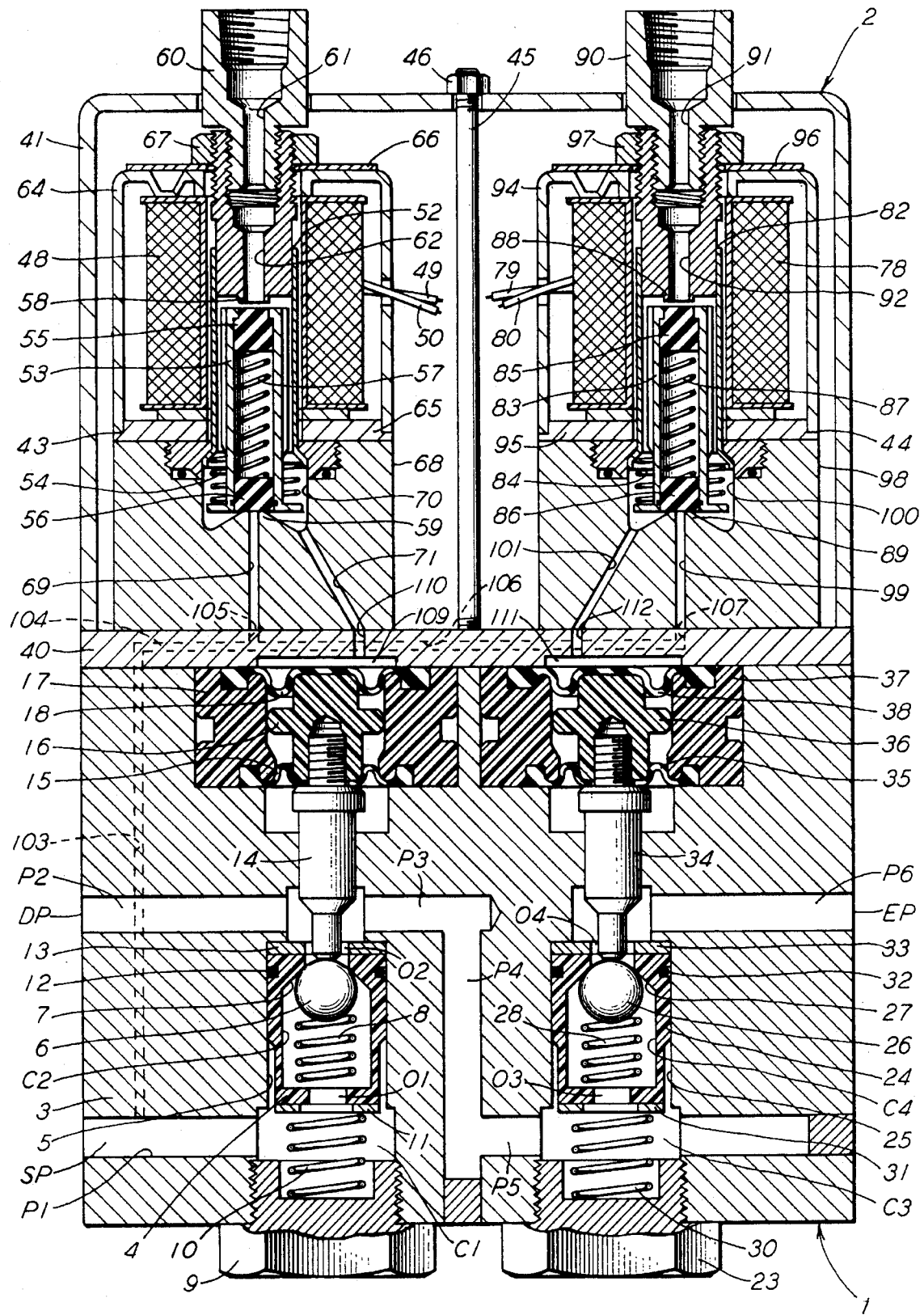

APPLICATION AND RELEASE MAGNET VALVE

FIELD OF THE INVENTION

This invention relates to a magnet valve assembly and more particularly to an application and release magnet valve employing a pair of electromagnetic solenoid portions and a pair of pneumatic valve portions for supplying, maintaining, and releasing the air pressure in the brake cylinders on a railway vehicle.

BACKGROUND OF THE INVENTION

One known type of application and release magnet valve employed a pair of electromagnetic solenoids which controlled the condition of valving members to supply, hold, or release air pressure in a pneumatic brake system. In this previous solenoid valve, the armature gap had to be gauged and adjusted during the assembly of the valve. This adjustment was necessary in order to obtain the correct magnetic force required to open the valve members against the force of the biasing spring. Further, the dynamic O-ring seals used to prevent the flow of air around the stem of the valve member also included increased frictional resistance which could cause the valve to malfunction. This problem was exaggerated, especially when the silicon grease lubricant on the O-rings and O-ring grooves or shoulders is dispersed after the valve is in operation for a long period of time. In addition, as the O-rings wear, the area of the contact surfaces increases so that the dynamic frictional resistance is amplified and results in an increased amount of malfunctions. Further, the metallic dust escalates the chafing and wearing of the O-ring seals so that leakage becomes a problem.

OBJECTS AND SUMMARY OF THE INVENTION

Accordingly, it is an object of this invention to provide a new and improved magnet valve assembly.

Another object of this invention is to provide a unique application and release magnet valve for supplying, maintaining, and releasing air pressure.

A further object of this invention is to provide a novel magnet valve having a pair of electromagnetic solenoids for controlling the delivery, holding, or exhausting of compressed air.

Yet another object of this invention is to provide an improved electropneumatic control valve having a pilot-operated diaphragm valve for initiating the supply of compressed air, for maintaining the level of compressed air, and for venting the compressed air to atmosphere.

Yet a further object of this invention is to provide an innovative electromagnetic pilot application and release valve which provides air pressure to a respective pair of diaphragm and plunger assemblies to operate a pair of ball check type of main valves for opening a fluid flow path from a supply port to a delivery port or for opening a fluid flow path from the delivery port to an exhaust port and for closing the fluid flow path from the supply port to the delivery port and closing the fluid flow path from the delivery port to the exhaust port.

Still another object of this invention is to provide an application and release magnet valve for supplying, maintaining, and releasing brake cylinder pressure comprising, a pneumatic portion and an electropneumatic portion, the pneumatic portion including a pair of check valves, the electropneumatic portion including a pair of solenoid-operated pilot valves, one of the pair of solenoid-operated pilot valves adapted to pressurize a first piston diaphragm chamber to actuate a first plunger to open one of the pair of check valves to establish communication between a supply port and a delivery port, and the other of the pair of solenoid-operated pilot valves adapted to pressurize a second piston diaphragm chamber to actuate a second plunger to open the other of the pair of check valves to establish communication between the delivery port and an exhaust port.

Still a further object of this invention is an improved application and release magnet valve which is simple in design, efficient in operation, economical in cost, reliable in use, durable in service, unique in construction, and easy to use.

DESCRIPTION OF THE DRAWINGS

The above objects and other attendant features and advantages will be more readily appreciated as the present invention becomes better understood by reference to the following detailed description when considered in conjunction with the accompanying drawing, wherein:

The single FIGURE of the drawing is an elevational cross-sectional view of an electropneumatic control valve for a compressed air system in accordance with the present invention.

DETAILED DESCRIPTION OF THE INVENTION

Referring now to the single FIGURE of the drawing, there is shown an application magnet valve assembly and a release magnet valve assembly for selectively opening and closing the air flow between supply, delivery and exhaust ports in accordance with the present invention. It will be seen that the valve assembly includes a lower pneumatic portion 1 and an upper electropneumatic portion 2. The lower pneumatic portion 1 includes a body member 3 having two main bores for accommodating an application valve assemblage and a release valve assemblage for controlling the fluid communication between supply port SP, delivery port DP and exhaust port EP, as will be described in greater detail hereinafter. The application valve assemblage includes a first nonmetallic check valve having a cartridge member 4 which is located in bore 5. An elastomeric ball valve 6 is normally biased against an internal conical valve seat 7 by a compression coil spring 8 which is caged between the lower peripheral surface of the ball valve 6 and the bottom end of the cartridge member 4. The first check valve cartridge 4 is held in place by a recessed hex head nut 9, a biasing spring 10 and a flat washer 11. A static O-ring seal 12 and a rubber washer 13 prevent air leakage around the exterior of the check valve cartridge 4.

It will be noted that the reduced lower end of a nonmetallic cylindrical plunger 14 engages the upper peripheral surface of the elastomeric ball valve 6. The upper threaded end of the plunger or push rod 14 passes through a center opening of a small rubber diaphragm 15 and is screw-threaded into the bottom of a nonmetallic piston member 16. The small diameter diaphragm 15 includes an outer peripheral bead which is situated in an annular groove formed in the bottom side of a nonmetallic spool-like guide bushing 17. It will be seen that the center portion of a larger diameter diaphragm 18 engages the top of the piston member 16. The larger diaphragm 18 includes an outer peripheral bead which is situated in an annular groove formed in the top side of the guide bushing 17.

As shown, the release valve assemblage includes a second check valve having a nonmetallic cartridge member 24 which is located in bore 25. An elastomeric ball valve 26 is urged against an internal conical valve seat 27 by a biasing spring 28 which is caged between the lower peripheral surface of the ball valve 26 and the bottom end of the cartridge member 24. The cartridge member 24 of the second check valve is held in place by a recessed hex head nut 23, a compression coil spring 30 and a flat washer 31. A static O-ring seal 32 and a rubber washer 33 prevent air leakage around the exterior of the check valve cartridge 24.

It will be seen that the reduced lower end of a nonmetallic cylindrical plunger member 34 contacts the upper peripheral surface of the elastomeric ball valve 26. The upper threaded end of the plunger or push rod 34 is inserted through a center hole formed in a small rubber diaphragm and is screw-threaded into the bottom of the nonmetallic piston member 36. The small rubber diaphragm 35 includes an outer peripheral bead which is placed in an annular groove or recess formed in the underside of a nonmetallic spool-like guide bushing 37. As shown, the center portion of a larger diameter rubber diaphragm 38 engages the top of the piston member 36. The larger diaphragm 38 includes an outer peripheral bead which is set into an annular recess form in the top side of the guide bushing 37.

It will be noted that cover plate 40 is suitably secured to the top of the body member 3. The electropneumatic portion 2 includes a protective cover or enclosure 41 which houses a pair of two-way normally closed electromagnetic or solenoid valves 43 and 44, which are manufactured and sold by KIP Incorporated of Farmington, Conn. A stud bolt 45 is screw-threaded into the cover plate 40. The free end of the stud 45 passes through a hole formed in the top of the protective cover 41 and a nut 46 securely holds the cover 41 in place. The first solenoid valve 43 is used to initiate a brake application while the second solenoid valve 44 is used to initiate a brake release.

The brake application solenoid valve 43 includes an electric coil 48 which is selectively energizable by a suitable potential source, such as, a direct current voltage (not shown) which is applied across leads or conductors 49 and 50. As shown, a first guide and core assembly 52 is internally mounted in the center of the coil member 48. A movable magnetic plunger member 53 is disposed below the magnetic core 52 and is spring-biased downwardly by a compression coil spring 54. The plunger member 53 carries an upper or top seal 55 and a lower or bottom seal 56. The seals 55 and 56 are biased in opposite directions by a compression coil spring 57. The upwardly biased seal 55 is disposed adjacent a stop orifice 58 while the downwardly biased seal 56 cooperates with a body orifice 59. A female threaded adapter fitting 60 having a through hole 61 is threadedly secured to the core and guide assembly 52 which also has an aligned through hole 62. It will be seen that a protective housing 64 is mounted on a base plate 65 and is held in place by a flat washer 66 and a hex head nut 67. The application solenoid assembly is screw-threaded and sealed onto a pilot valve body 68 having an inlet passageway 69, a chamber 70, and an outlet passageway 71.

The brake release solenoid valve 44 includes an electric coil 78 which is selectively energized by a suitable direct current potential source (not shown) which is applied across leads or conductors 79 and 80. A second guide and core assembly 82 is centrally mounted within the coil member 78. A movable magnetic plunger member 83 is disposed below the magnetic core 82 and is biased downwardly by a compression coil spring 84. The plunger member 83 carries an upper or top seal 85 and a lower or bottom seal 86. The seals 85 and 86 are biased in opposite directions by a compression coil spring 87. The upwardly biased seal 85 is disposed adjacent a stop orifice 88 while the downwardly biased seal 86 cooperates with a body orifice 89. A female threaded adapter fitting 90 having a through hole 91 is threadedly secured to the core and guide assembly 82 which also includes an aligned through passageway 92. As shown, a protective housing 94 is mounted on a base plate 95 and is securely attached by a flat washer 96 and a hex head nut 97. The release solenoid assembly is screw-threaded and sealed onto a pilot valve body 98 which includes an inlet passageway 99, a chamber 100, and an outlet passageway 101.

It will be seen that the upper ends of the two adapter fittings 60 and 90 protrude through the top of the protective housing 41 and are suitably vented to atmosphere. As shown, the supply port SP leads to passageway P1 which, in turn, is connected to a lower chamber C1. The lower chamber C1 is connected to an upper chamber C2 via opening 01 formed in the bottom of the cartridge 4. A check valve opening 02 is formed in the upper end of cartridge 4. The opening 02 leads to passageway P2 which is connected to delivery port DP. The opening 02 also leads to passageways P3, P4 and P5. The passageway P5 communicates with a lower chamber C3 which is connected to an upper chamber C4 via opening 03 formed in the bottom of the cartridge 24. A check valve opening 04 is formed in the upper end of the cartridge 24. The opening 04 leads to a passageway P6 which in turn communicates with the exhaust port EP. It will be noted that the supply passageway P1 is connected to inlet passageway 69 via passageway 103 formed in the valve body 3 and also passageways 104 and 105 formed in the base plate 40. Likewise, the supply passageway P1 is connected to inlet passageway 99 via passageways 103 and 104 as well as passageways 106 and 107 formed in the base plate 40. As shown, the outlet passageway 71 of pilot valve 68 is connected to a pressure pilot chamber 109 via passageway 110 formed in the base plate 40 while the outlet passageway 101 of pilot valve 98 is connected to a pressure chamber 111 via passageway 112 formed in the base plate 40.

Let us now assume that it is desired to apply the brakes on the transit railway vehicles or train. Under this condition, the operator simply moves the controller handle to a select braking position wherein a voltage is applied across leads 49 and 50 so that the application solenoid coil 48 becomes energized. The energization of the application solenoid 48 causes the electromagnetic field to attract and pick up the plunger 53. Thus, the upper seal 55 closes off the stop orifice 58 and unseats the lower seal 56 from the body orifice 59. Accordingly, air pressure is delivered from the supply port SP to the chamber 109 via passageways P1, 103, 104, 105, 69, orifice 59, chamber 70 and passageways 71 and 110. The pressurization of chamber 109 exerts a downward force on the larger diaphragm 18 which moves the piston 16, the smaller diaphragm 15 and the plunger 14 downwardly to unseat the elastomeric ball valve 6 from the conical seat 7. Thus, pressurized air flows from the main reservoir, through supply port SP, passageway P1, chamber C1, opening 01, chamber C2, opening 02, passageway P2, and via delivery port DP to the brake cylinder on the railway vehicle. Now when the pressure in the brake cylinder reaches the desired selected level, the solenoid 48 is deenergized and the biasing spring 54 seats the lower seal 56 on the body orifice 59 and unseats the upper seal 55 from stop orifice 58. At this time, the pilot chamber 109 is connected and vented to atmosphere via passageways 110 and 71, chamber 70, stop orifice 58 and passageways 62 and 61. Now, biasing spring 8 urges and seats the elastomeric ball valve on its conical seat 7, and returns the plunger 14, piston 16 and diaphragms 15 and 18 to their original position as shown in the drawing. Accordingly, the magnet valve assembly assumes a lap position so that the air pressure in the brake cylinders is maintained at the desired selected level since both the application and release valves are closed. It will be appreciated that if an increased braking effort is desired, the application solenoid coil 48 may be reenergized to cause greater amount of pressure which will be delivered to the brake cylinders on the vehicle. Again, when the air pressure in the brake cylinders reaches the desired level, the application solenoid coil 48 is deenergized and the application magnet valve again reverts to the position shown in the drawing.

Now when it is desired to release the brakes, controller handle is moved by the operator to a release position so that the release solenoid coil 78 will become energized. The energization of the release solenoid coil 78 causes the electromagnetic field to attract and pick up the plunger 83 so that the upper seal 85 closes the stop orifice 88 and unseats the lower seal 86 off of the body orifice 89. Thus, air pressure is delivered from the main reservoir to the supply port SP to the chamber 111 via passageways P1, 103, 104, 107, 99, chamber 100 and passageways 101 and 112. The pressurization of the chamber 111 causes a downward force to be exerted on the top of the larger diaphragm 38 which results in the downward movement of the piston 36, the smaller diaphragm 35 and the plunger 34 downwardly to unseat the elastomeric ball valve 26 from the conical seat 27. Thus, pressurized air flows from the brake cylinders through the delivery port DP, passageways P2, P3, P4, P5, chamber C3, opening 03, chamber C4, opening 04, passageway P6 to the exhaust port EP to atmosphere. Now when the air is exhausted, the solenoid coil 78 is deenergized and the biasing spring 84 seats the lower seal 86 on the body orifice 89 and unseats the upper seal 85 from the stop orifice 88. Accordingly, the air pressure in pilot chamber 111 is capable of being exhausted to atmosphere via passageways 112 and 101, chamber 100, stop orifice 88, and passageways 92 and 91. At approximately the same time, the biasing spring 28 urges and seats the elastomeric ball valve 26 on its seat 27 and returns the plunger 34, piston 36 and diaphragms 35 and 38 to their original position, as shown in the drawing. It will be appreciated that the operation of the application and release magnet valves may be repeated to supply, maintain, and release brake cylinder pressure. The use of a double diaphragm of different diameters alleviates the frictional and lubricating problems associated with dynamic O-ring seals A leakproof seal is achieved with an elastomeric ball valve located in both the application and release magnet valves. The unified diaphragm, piston and plunger assembly of each of the magnet valves is guided in a nonmetallic linear bushing which eliminates twisting of the diaphragms.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly set forth in this application. It will be understood that variations, modifications, equivalents and substitutions for components of the above specifically-described embodiment of the invention may be made by those skilled in the art without departing from the spirit and scope of the invention as set forth in the appended claims.

What we claim is:

1. An application and release magnet valve for supplying, maintaining, and releasing brake cylinder pressure comprising, a pneumatic portion and an electropneumatic portion, said pneumatic portion including a pair of check valves, each of said pair of check valves having a cartridge member and an elastomeric ball valve, said electropneumatic portion including a pair of solenoid-operated pilot valves, one of said pair of solenoid-operated pilot valves includes a first piston diaphragm chamber, said first piston diaphragm chamber is pressurized via a supply port to actuate a first plunger to open one of said pair of check valves to establish communication between said supply port and a delivery port, and the other of said pair of solenoid-operated pilot valves includes a second piston diaphragm chamber, said second piston diaphragm chamber is pressurized via said supply port to actuate a second plunger to open the other of said pair of check valves to establish communication between said delivery port and an exhaust port.

2. The application and release magnet valve as defined in claim 1, wherein said elastomeric ball valve is biased against a valve seat by a compression spring.

3. The application and release magnet valve as defined in claim 1, wherein said one of said pair of solenoid-operated pilot valves includes a first coil which is energized to open a first pilot valve.

4. The application and release magnet valve as defined in claim 3, wherein pressure in said first piston diaphragm chamber is exhausted to atmosphere when said first coil is deenergized.

5. The application and release magnet valve as defined in claim 1, wherein said other of said pair of solenoid-operated pilot valves includes a second coil which is energized to open a second pilot valve.

6. The application and release magnet valve as defined in claim 5, wherein pressure in said second piston diaphragm chamber is exhausted to atmosphere when said second coil is deenergized.

7. The application and release magnet valve as defined in claim 1, wherein said first piston is slidably disposed in a first guide member.

8. The application and release magnet valve as defined in claim 7, wherein a first large diaphragm engages the top of said first piston and a first smaller diaphragm engages the bottom of said first piston.

9. The application and release magnet valve as defined in claim 8, wherein said pneumatic portion includes an apertured metallic body member which is covered by a plate member for holding said first large diaphragm against said first guide member.

10. The application and release magnet valve as defined in claim 7, wherein said first guide member is a nonmetallic spool-like bushing.

11. The application and release magnet as defined in claim 7, wherein said first piston is a nonmetallic piston member.

12. The application and release magnet valve as defined in claim 1, wherein said second piston is slidably disposed in a second guide member.

13. The application and release magnet valve as defined in claim 12, wherein a second large diaphragm engages the top of said second piston and a second smaller diaphragm engages the bottom of said second piston.

14. The application and release magnet valve as defined in claim 13, wherein said pneumatic portion includes an apertured metallic body member which is covered by a plate member for holding said second large diaphragm against said second guide member.

15. The application and release magnet valve as defined in claim 12, wherein said second guide member is a nonmetallic spool-like bushing.

16. The application and release magnet valve as defined in claim 12, wherein said second piston is a nonmetallic piston member.

17. The application and release magnet valve as defined in claim 1, wherein a protective cover houses said electropneumatic portion.

18. The application and release magnet valve as defined in claim 1, wherein said one of said pair of solenoid-operated pilot valves includes a movable magnetic plunger member having a first seal which closes and opens said supply port to said first piston diaphragm chamber and having a second seal which opens and closes said first piston diaphragm chamber to atmosphere.

19. The application and release magnet valve as defined in claim 1, wherein said other of said pair of solenoid-operated pilot valves includes a movable magnetic plunger member having a first seal which closes and opens said supply port to said second piston diaphragm chamber and having a second seal which opens and closes said second piston diaphragm chamber to atmosphere.

\* \* \* \* \*